H. F. DORSEY.
CHURN.
APPLICATION FILED APR. 19, 1909.

930,942.

Patented Aug. 10, 1909.
2 SHEETS—SHEET 1.

Witnesses
L. B. James
F. O. ......

Inventor
HOWARD F. DORSEY
By ............
Attorneys

H. F. DORSEY.
CHURN.
APPLICATION FILED APR. 19, 1909.
930,942.
Patented Aug. 10, 1909.
2 SHEETS—SHEET 2.
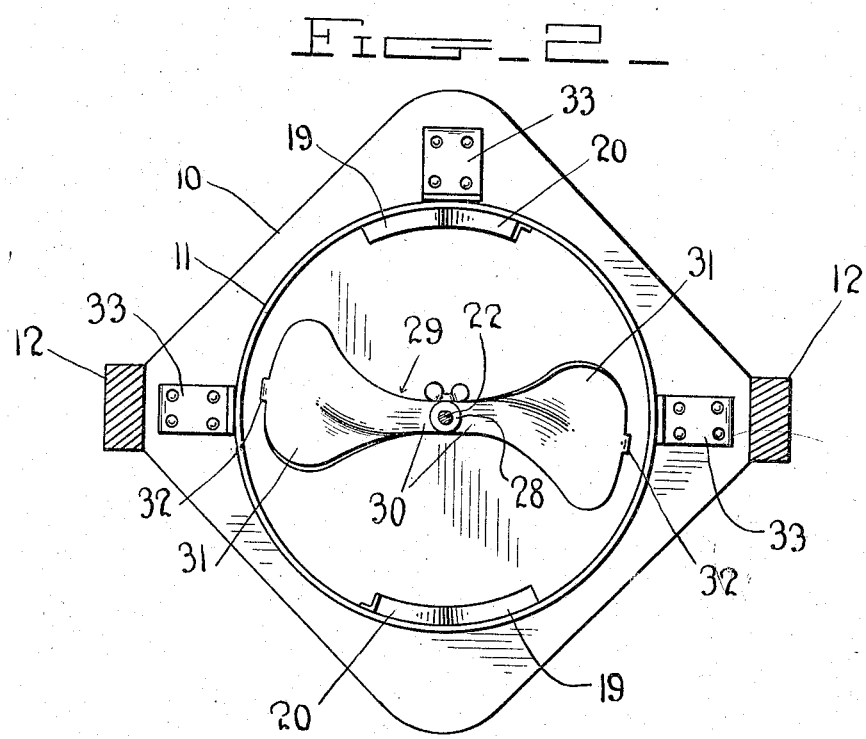
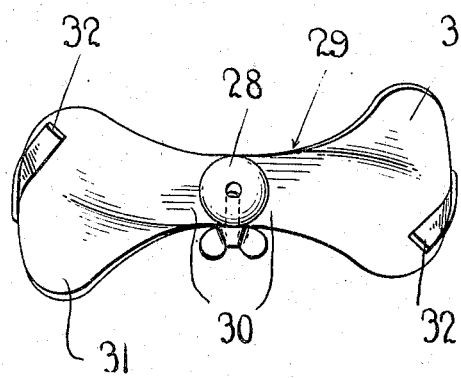
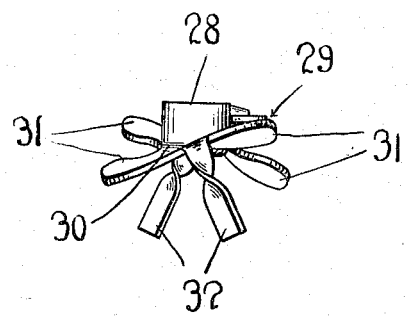
Witnesses:
L. B. James
Inventor
HOWARD F. DORSEY
Attorneys

UNITED STATES PATENT OFFICE.

HOWARD F. DORSEY, OF LOCKPORT, LOUISIANA.

CHURN.

No. 930,942. Specification of Letters Patent. Patented Aug. 10, 1909.

Application filed April 19, 1909. Serial No. 490,878.

*To all whom it may concern:*

Be it known that I, HOWARD F. DORSEY, a citizen of the United States, residing at Lockport, in the parish of Lafourche, State of Louisiana, have invented certain new and useful Improvements in Churns; and I do hereby declare the following to be a full, clear, and exact description of the invention, such as will enable others skilled in the art to which it appertains to make and use the same.

The invention relates to a churn and more particularly to the class of rotary churns.

The primary object of the invention is the provision of a churn in which its dasher is provided with peculiarly shaped blades which are especially designed to effect the proper agitation of the cream to increase the rapidity with which butter is formed therefrom and to facilitate the general operation of the machine.

Another object of the invention is the provision of a churn of this character in which the agitation of the cream within the churn body is materially increased to effect rapid formation of the butter therefrom, and to prevent undue splashing of the cream during the operation of the machine, and also to render the rotary action of the dasher smooth and easy.

With these and other objects in view the invention consists in the construction, combination and arrangement of parts, as will be hereinafter more fully described, illustrated in the accompanying drawings, which disclose the preferred form of embodiment of the invention, and particularly pointed out in the claims hereunto appended, it being understood that changes, variations and modifications may be made within the scope of the appended claims without departing from the spirit or sacrificing any of the advantages of the invention.

Figure 1:
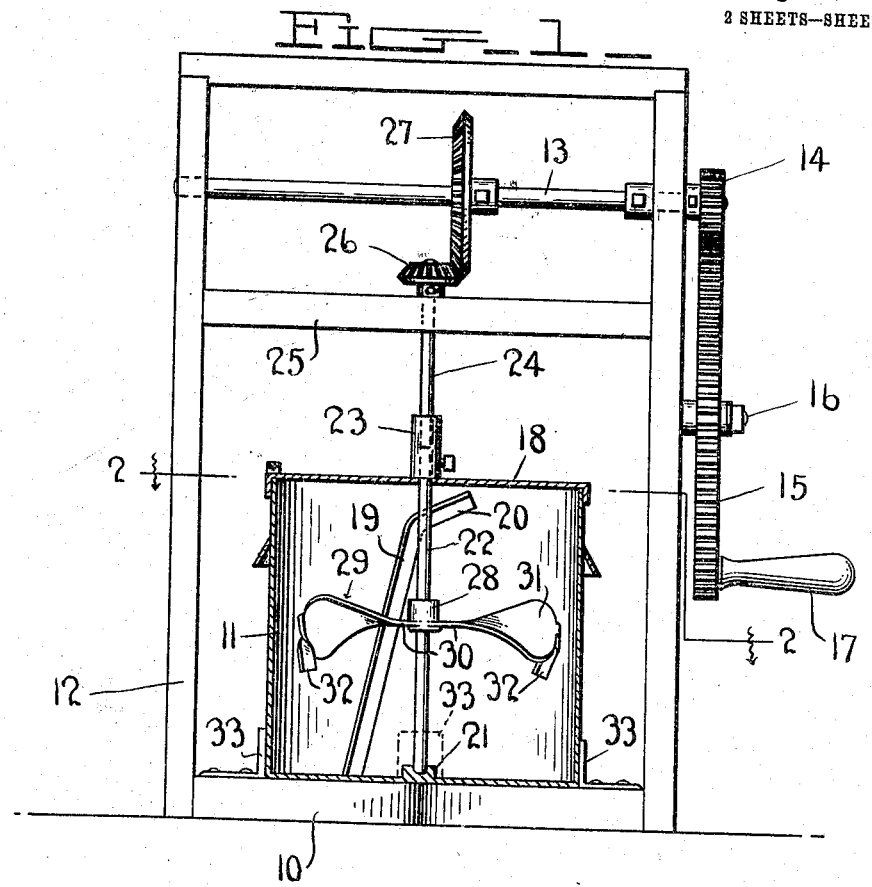
Figure 3:
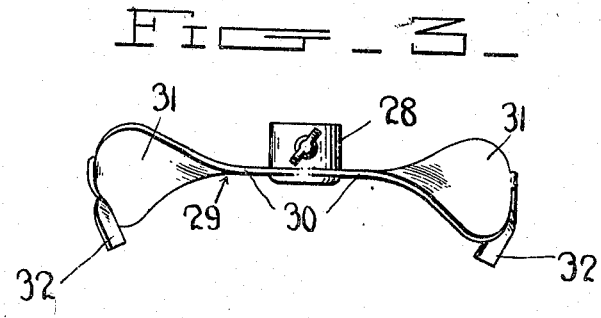

In the drawings:—Figure 1 is a side elevation of the invention with the churn body or receptacle in section. Fig. 2 is a sectional view on the line 2—2 of Fig. 1 with the cover or top removed. Fig. 3 is a side elevation of the churn dasher removed from the churn. Fig. 4 is a bottom plan view thereof. Fig. 5 is an end elevation.

Similar reference characters indicate corresponding parts throughout the several views in the drawings.

Referring more particularly to the drawings the churn construction comprises a base or platform 10, which may be of any desirable shape upon which the cream receptacle 11, is supported which latter is of cylindrical shape, and which also supports a frame work 12, carrying a horizontally disposed drive shaft 13, the latter having fixed thereto a pinion 14, enmeshing with a gear wheel 15, journaled upon a stud shaft 16, carried by the frame structure and which gear wheel carries a crank or operating handle 17, to enable the rotation of the drive shaft.

Mounted upon the receptacle 11, is a removable centrally perforated cover 18, which latter is adapted to snugly fit the receptacle so as to produce a fluid tight closure between the same. Secured at diametrically opposite points to the inner face of the side wall of the receptacle 11, are stationary breakers or fins, each formed with a straight portion 19, disposed at an incline with respect to the bottom of the receptacle and terminating in an angular portion 20, both of which portions project inwardly from the inner face of the receptacle, and the said angular portions 20 of the breakers or fins serve to deflect the cream downwardly in the receptacle during the agitation thereof.

Located centrally on the bottom of the receptacle 11, within the same is a bearing 21, in which is journaled the lower end of a rotatable dasher shaft 22, which latter extends through the perforated cover and is connected by a detachable coupling sleeve 23, to a driven shaft 24, journaled vertically at the center of a cross bar 25, fixed in the frame structure.

Fixed to the driven shafts 24 above the cross bar 25, is a pinion 26, enmeshing with a beveled gear 27, adjustably secured to the drive shaft 13, through the medium of which rotary motion is imparted to the dasher as will be hereinafter described.

Longitudinally adjustable on the dasher shaft 22, is a dasher which comprises a hub 28, from which project oppositely disposed blades 29, each having a narrow neck portion 30, with respect to a widened portion 31, the same being twisted to lie at an angle to the narrow portion, and one widened portion being at a reversed angle with respect to the other, so that in agitating the cream one widened portion will tend to lift the cream upwardly when the dasher rotates in one direction and should it move in an opposite direction the said widened portions of the blades will disperse the cream in a downward direction. Located centrally at the outer edge of the widened portions of the blades and integral therewith are downwardly disposed oppositely inclined agitator fingers 32, the same twisted and gradually increasing in thickness toward their free extremities, so that the free extremities thereof will effect a centrifugal agitation of the cream while the remaining portions of the fingers will do likewise but creating a current in an opposite direction with respect to that created by the free extremities of the fingers.

Secured to the base 10 at opposite points thereof and rising therefrom are yieldable ears 33, which are adapted to clamp or hold the receptacle rigidly supported on the base of the frame structure.

From the foregoing description it is thought a clear and concise understanding of the construction and operation of the machine will be had therefore a more extended explanation is omitted.

What is claimed is:—

1. In a churn, a rotary dasher comprising a hub having oppositely disposed blades projecting outwardly from said hub and lying in the same plane with respect to each other, each blade formed of a narrow portion with respect to a widened portion, the said widened portions being twisted and disposed at reversed angles with respect to each other and downwardly and inwardly converging twisted extensions formed at the free ends of the blades.

2. In a churn, a rotary dasher comprising a hub having oppositely disposed blades, each formed of a narrow portion with respect to a widened portion, the said widened portions being twisted and disposed at reversed angles with respect to each other and downwardly and inwardly converging twisted fingers depending from the said blades, one finger being disposed at an opposite angle with respect to the other.

3. In a churn, a rotary dasher comprising a hub having oppositely disposed blades, each formed of a narrow portion with respect to a widened portion, the said widened portions being twisted and disposed at reversed angles with respect to each other and downwardly and inwardly converging reversely twisted fingers depending at an angle with respect to each other from the widened portions of said blade.

4. In a churn, a receptacle, breakers fixed at diametrically opposite points of and projecting inwardly from the inner face of said receptacle, each of said breakers formed with a straight portion and an angular portion, with respect thereto, the latter being located near the upper end of the receptacle, a rotatable oppositely bladed dasher mounted in said receptacle, and twisted depending agitator fingers on said blades of the dasher.

In testimony whereof, I affix my signature, in presence of two witnesses.

HOWARD F. DORSEY.

Witnesses:
L. C. GARVIN,
CHAS. A PAGH NGIII.